US009688141B2

(12) United States Patent
Takaishi et al.

(10) Patent No.: US 9,688,141 B2
(45) Date of Patent: Jun. 27, 2017

(54) CLUTCH CONTROL DEVICE FOR FOUR-WHEEL DRIVE VEHICLE

(71) Applicant: Nissan Motor Co., Ltd., Yokohama-shi, Kanagawa (JP)

(72) Inventors: Tetsu Takaishi, Kanagawa (JP); Atsuhiro Mori, Kanagawa (JP); Shunichi Mitsuishi, Kanagawa (JP); Makoto Morita, Kanagawa (JP); Katsuyoshi Ogawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/117,822

(22) PCT Filed: Feb. 4, 2015

(86) PCT No.: PCT/JP2015/053032
§ 371 (c)(1),
(2) Date: Aug. 10, 2016

(87) PCT Pub. No.: WO2015/129410
PCT Pub. Date: Sep. 3, 2015

(65) Prior Publication Data
US 2017/0008396 A1 Jan. 12, 2017

(30) Foreign Application Priority Data

Feb. 27, 2014 (JP) ................... 2014-036741

(51) Int. Cl.
*B60K 23/08* (2006.01)
*F16D 48/06* (2006.01)
(Continued)

(52) U.S. Cl.
CPC .............. *B60K 23/08* (2013.01); *B60K 17/02* (2013.01); *B60K 17/348* (2013.01);
(Continued)

(58) Field of Classification Search
CPC .... B60K 23/08; B60K 17/02; B60K 17/3462; B60K 17/348; B60K 23/04; F16D 13/74; F16H 57/0447; F16H 57/0473
See application file for complete search history.

(56) References Cited

U.S. PATENT DOCUMENTS 8,764,599 B2 * 7/2014 Ekonen ................ B60K 17/344
180/244
9,440,533 B2 * 9/2016 Maeda ................. B60K 17/354
(Continued)

FOREIGN PATENT DOCUMENTS

CN 103153674 A 6/2013
CN 103442922 A 12/2013
(Continued)

*Primary Examiner* — Stacey Fluhart
(74) *Attorney, Agent, or Firm* — Global IP Counselors, LLP

(57) ABSTRACT

A clutch control device is provided for a four-wheel drive vehicle. The clutch control device is able to suppress the elevation of the temperature of the oil supplied to a friction clutch during two-wheel drive travel when the friction clutch is released. The clutch control device includes a dog clutch and an electronic control coupling. The friction clutch is housed in a coupling case. When the dog clutch and the friction clutch are released, a two-wheel drive mode is selected. The coupling case has a passage opening that is closed to retain lubrication oil in an oil chamber with respect to a clutch chamber that houses the friction clutch. When oil stirring conditions are met thereafter, the passage opening is opened and the lubrication oil is allowed to flow into the clutch chamber from the oil chamber.

10 Claims, 9 Drawing Sheets

(51) Int. Cl.

| | | |
|---|---|---|
| *F16H 57/04* | (2010.01) | |
| *B60K 17/02* | (2006.01) | |
| *B60K 17/346* | (2006.01) | |
| *B60K 17/348* | (2006.01) | |
| *B60K 23/04* | (2006.01) | |
| *F16D 13/74* | (2006.01) | |
| *F16D 21/00* | (2006.01) | |
| *F16D 13/72* | (2006.01) | |
| *F16D 48/02* | (2006.01) | |
| *B60K 17/35* | (2006.01) | |

(52) U.S. Cl.
CPC .......... *B60K 17/3467* (2013.01); *B60K 23/04* (2013.01); *F16D 13/72* (2013.01); *F16D 13/74* (2013.01); *F16D 21/00* (2013.01); *F16D 48/02* (2013.01); *F16D 48/066* (2013.01); *F16H 57/0409* (2013.01); *F16H 57/0447* (2013.01); *F16H 57/0473* (2013.01); *F16H 57/0483* (2013.01); *B60K 17/35* (2013.01); *B60K 17/3515* (2013.01); *B60K 23/0808* (2013.01); *B60K 2023/085* (2013.01); *F16D 2048/0218* (2013.01); *F16D 2048/0221* (2013.01); *F16D 2048/0224* (2013.01); *F16D 2500/1045* (2013.01); *F16D 2500/10431* (2013.01); *F16D 2500/10462* (2013.01); *F16D 2500/3026* (2013.01); *F16D 2500/3055* (2013.01); *F16D 2500/3056* (2013.01); *F16D 2500/30401* (2013.01); *F16D 2500/5106* (2013.01); *F16D 2500/7045* (2013.01)

(56) References Cited

U.S. PATENT DOCUMENTS

2009/0211830 A1* 8/2009 Kato .................... B60K 23/08
    180/244
2016/0355089 A1* 12/2016 Ogawa ................ B60K 23/08

FOREIGN PATENT DOCUMENTS

| | | |
|---|---|---|
| JP | 2007-285459 A | 11/2007 |
| JP | 2009-243577 A | 10/2009 |
| JP | 2009-269605 A | 11/2009 |
| JP | 2011-105256 A | 6/2011 |
| JP | 2011-235757 A | 11/2011 |
| JP | 2012-61923 A | 3/2012 |
| JP | 2013-100079 A | 5/2013 |
| JP | 2013-132996 A | 7/2013 |
| WO | 2012/146785 A1 | 11/2012 |

* cited by examiner

CLUTCH CONTROL DEVICE FOR FOUR-WHEEL DRIVE VEHICLE

CROSS-REFERENCE TO RELATED APPLICATIONS

This application is a U.S. National stage application of International Application No. PCT/JP2015/053032, filed Feb. 4, 2015, which claims priority to JP Patent Application No. 2014-036741 filed on Feb. 27, 2014, the contents of which are hereby incorporated herein by reference.

BACKGROUND

Field of the Invention

The present invention generally relates to a clutch control device for a four-wheel drive vehicle in which a system for transmitting drive force from the main drive wheels to the auxiliary drive wheels is provided with a dog clutch and a friction clutch.

Background Information

Conventionally, in a front wheel drive based four-wheel drive vehicle in which a system for transmitting drive force from the front wheels to the rear wheels is provided with a dog clutch and a friction clutch, a clutch control device that engages the dog clutch and the friction clutch during four-wheel drive travel and disengages the dog clutch and the friction clutch during two-wheel drive travel is known (for example, refer to Japanese Laid Open Patent Application No. 2011-105256). In this clutch control device, a supply passage that supplies differential oil for lubricating the rear differential to the interior of the friction clutch, and a return passage that returns the differential oil supplied to the friction clutch to the rear differential, are formed. The differential oil is then scraped up by the rotation of the rear differential, and the differential oil is circulated from the supply passage to the friction clutch, then to the rear differential via the return passage.

SUMMARY

In a conventional device, the dog clutch and friction clutch are both released during two-wheel drive travel, and the differential oil passes through the supply passage and is circulated to the rear differential via the return passage. Consequently, drag torque is generated due to the resistance of the differential oil, and it is difficult to improve fuel efficiency. Therefore, a clutch control device for a four-wheel drive vehicle can be conceived in which improvement in fuel efficiency is achieved by limiting the amount of lubrication oil that is supplied to the friction clutch, when the friction clutch is released, to reduce the oil stirring resistance in the friction clutch. However, in this case, since the amount of lubrication oil that is supplied to the friction clutch is limited, the heat capacity of the lubrication oil is reduced. Consequently, there is the problem that the lubrication oil that is supplied to the friction clutch becomes hot.

In view of the problems described above, an object of the present invention is to provide a clutch control device for a four-wheel drive vehicle capable of suppressing the increase in temperature of the lubrication oil that is supplied to a friction clutch, during two-wheel drive travel, when the friction clutch is released.

In order to achieve the object above, the clutch control device for a four-wheel drive vehicle of the present invention is mounted on a four-wheel drive vehicle in which, of the left and right front wheels and the left and right rear wheels, one pair is set as the main drive wheels, which are connected to the drive source, and the other is set as the auxiliary drive wheels, which are connected to the drive source via a clutch, and is provided with a dog clutch, a friction clutch, and a clutch controller. The dog clutch is provided at a drive branch position from the main drive wheels to the auxiliary drive wheels, and separates the system for transmitting drive force to the auxiliary drive wheels from the system for transmitting drive force to the main drive wheels by releasing the clutch. The friction clutch is provided in a downstream position of the dog clutch, allocates a portion of the drive force from the drive source to the auxiliary drive wheels in accordance with the clutch engagement capacity, and is housed in a clutch case. The clutch controller carries out an engagement and disengagement control of the dog clutch and an engagement and disengagement control of the friction clutch. In this clutch control device for a four-wheel drive vehicle, the clutch case comprises a clutch chamber that houses the friction clutch, an oil chamber that is partitioned from the clutch chamber by a partition wall, an oil flow channel that places the clutch chamber in communication with the oil chamber and conveys lubrication oil from the clutch chamber to the oil chamber by the centrifugal force that is generated by the rotation of the friction clutch, and a passage opening provided in the partition wall that can be opened and closed. Then, when a two-wheel drive mode is selected, which releases the dog clutch and the friction clutch, the clutch controller closes the passage opening and stores the lubrication oil in the oil chamber. In addition, after selecting the disconnected, two-wheel drive mode, when oil stirring conditions are met, in which the temperature of the lubrication oil in the clutch chamber is elevated, the clutch controller opens the passage opening and causes the lubrication oil to flow from the oil chamber to the clutch chamber.

Therefore, in the clutch control device for a four-wheel drive vehicle of the present invention, when the disconnected, two-wheel drive mode which releases the dog clutch and the friction clutch is selected, the lubrication oil is stored in the oil chamber. Thereafter, when oil stirring conditions are met, in which the temperature of the lubrication oil that is supplied to the friction clutch and that remains in the clutch chamber is elevated, the clutch controller opens the passage opening and causes the lubrication oil to flow from the oil chamber to the clutch chamber in which the friction clutch is housed. Accordingly, even if the oil temperature in the clutch chamber is elevated, by causing lubrication oil stored in the oil chamber with a relatively low temperature to flow into the clutch chamber, it is possible to reduce the oil temperature in the clutch chamber. It is thereby possible to suppress the elevation of the temperature of the oil supplied to the friction clutch during two-wheel drive travel, when the friction clutch is released.

DETAILED DESCRIPTION OF THE EMBODIMENTS

Figure 1:
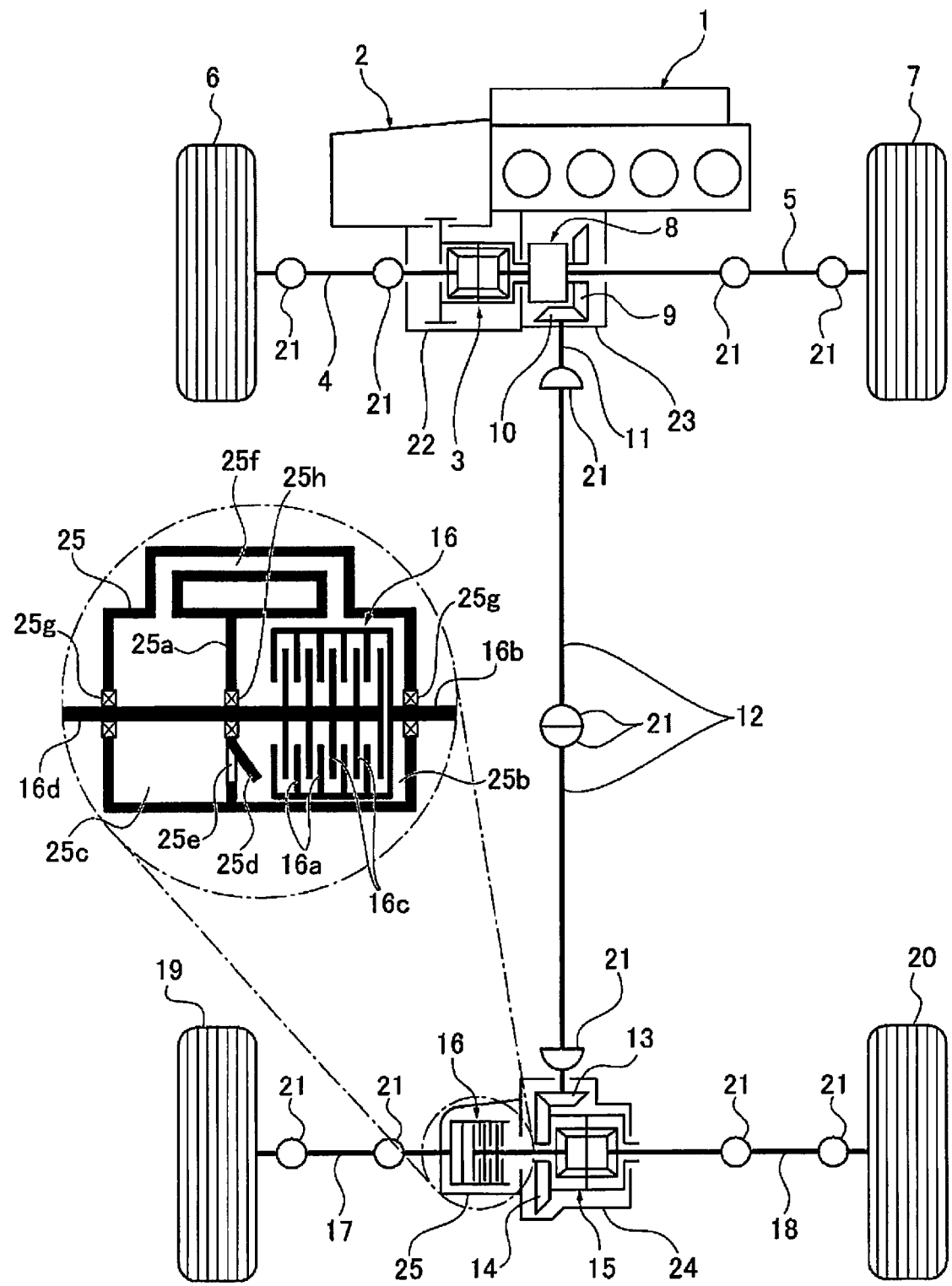
FIG. 1 is a block view illustrating a configuration of a drive system of a front wheel drive based four-wheel drive vehicle to which is applied a clutch control device in accordance with a first embodiment.

Embodiments for carrying out the clutch control device for a four-wheel drive vehicle of the present invention will be described below based on the first embodiment illustrated in the drawings.

First Embodiment

Referring initially to FIG. 1, a front wheel drive based four-wheel drive vehicle (one example of a four-wheel drive vehicle) is schematically illustrated with a clutch control device in accordance with a first embodiment. The overall configuration of the clutch control device for a drive system configuration of four-wheel drive vehicle will be described first.

Drive System Configuration of the Four-Wheel Drive Vehicle

FIG. 1 illustrates the configuration of the drive system of a front wheel drive based four-wheel drive vehicle to which is applied the clutch control device. The drive system configuration of the four-wheel drive vehicle will be described below based on FIG. 1.

The front wheel drive system of the four-wheel drive vehicle is provided with a transverse engine 1 (drive source), a transmission 2, a front differential 3, a left front wheel drive shaft 4, a right front wheel drive shaft 5, a left front wheel 6 (main drive wheel), and a right front wheel 7 (main drive wheel), as illustrated in FIG. 1. That is, the drive force is transmitted from the transverse engine 1 and the transmission 2 to the left and right front wheel drive shafts 4, 5 via the front differential 3, and constantly drives the left and right front wheels 6 and 7 while allowing a differential rotation.

The rear wheel drive system of the four-wheel drive vehicle comprises a dog clutch 8 (dog clutch), a bevel gear 9, an output pinion 10, a rear wheel output shaft 11, a propeller shaft 12, a drive pinion 13, a ring gear 14, a rear differential 15, an electronically controlled coupling 16 (friction clutch), a left rear wheel drive shaft 17, a right rear wheel drive shaft 18, a left rear wheel 19 (auxiliary drive wheel), and a right rear wheel 20 (auxiliary drive wheel), as illustrated in FIG. 1. In FIG. 1, a universal joint 21 is provided. That is, the rear wheel drive system of the four-wheel drive vehicle is configured to be a drive system with which it is possible to select between two-wheel drive travel (i.e., disconnected, two-wheel drive mode) in which the left and right rear wheels 19 and 20, which are auxiliary drive wheels, are disconnected from the transverse engine 1 by releasing both the dog clutch 8 and the electronically controlled coupling 16, and four-wheel drive travel (i.e., connected, four-wheel drive mode) in which the left and right rear wheels 19 and 20, which are auxiliary drive wheels, are connected to the transverse engine 1 by engaging both the dog clutch 8 and the electronically controlled coupling 16. It is possible to stop the rotation of the drive system (rotation of the propeller shaft 12, etc.) on the downstream side of the dog clutch 8 (between the dog clutch 8 and the left and right rear wheels 19 and 20) by releasing this dog clutch 8, thereby suppressing friction loss and oil stirring loss to achieve improved fuel efficiency.

The dog clutch 8 is a dog clutch that is provided at a drive branch position from the left and right front wheels 6 and 7 to the left and right rear wheels 19 and 20, and that separates the system for transmitting drive force to the left and right rear wheels 19 and 20 from the system for transmitting drive force to the left and right front wheels 6 and 7 by releasing the clutch. The input side meshing member (not shown) of the dog clutch 8 is connected to the differential case of the front differential 3, and the output side meshing member (not shown) of the dog clutch 8 is connected to the bevel gear 9. The dog clutch 8, the bevel gear 9, the output pinion 10, and a portion of the rear wheel output shaft 11 are incorporated in a transfer case 23 that is fixed to a position adjacent to the front differential case 22. For example, a dog clutch in which one of a pair of meshing members is a fixing member and the other is a movable member, a spring (not shown) that biases in the engaging direction is provided between the fixing member and the movable member, and a screw groove (not shown) that can be fitted with a solenoid pin (not shown) is formed on the outer perimeter of the movable member, is used as this dog clutch 8. When the solenoid pin is projected and fitted to the screw groove, this dog clutch 8 releases the engagement due to the movable member making a stroke in the releasing direction while being rotated and the stroke amount exceeding a predetermined amount. On the other hand, when the fitting of the solenoid pin with respect to the screw groove is disengaged, the movable member makes a stroke in the engaging direction toward the fixing member due to the biasing force of the spring, and the teeth of the two are meshed and engaged.

The electronically controlled coupling 16 is a friction clutch that is provided in a downstream position of the dog clutch 8 (position between the dog clutch 8 and the auxiliary drive wheels, in this case, the left and right rear wheels 19 and 20), and that allocates a portion of the drive force from the transverse engine 1 to the left and right rear wheels 19 and 20, in accordance with the clutch engagement capacity. An input side clutch plate 16a of the electronically controlled coupling 16 is connected to a left side gear of the rear differential 15 via a clutch input shaft 16b. The output side clutch plate 16c of the electronically controlled coupling 16 is connected to a left rear wheel drive shaft 17 via the clutch output shaft 16d. This electronically controlled coupling 16 is incorporated in a coupling case 25 (clutch case) that is fixed in a position adjacent to a rear differential case 24. For example, a dog clutch comprising a multi-plate friction clutch in which multiple input-side clutch plates 16a and output-side clutch plates 16c are alternately arranged, a fixed cam piston (not shown) and a movable cam piston (not shown) which have opposing cam surfaces, and a cam member (not shown) that is interposed between the opposing cam surfaces, is used as this electronically controlled coupling 16. The engagement of the electronically controlled coupling 16 is carried out by the movable cam piston being moved in the clutch engaging direction in accordance with the rotation angle to increase the frictional engagement force of the multi-plate friction clutch, due to a cam action that expands the piston gap that is generated by an electric motor (not shown) rotating the movable cam piston. The release of the electronically controlled coupling 16 is carried out by the movable cam piston being moved in the clutch releasing direction in accordance with the rotation angle to decrease the frictional engagement force of the multi-plate friction clutch, due to a cam action that reduces the piston gap that is generated by the electric motor rotating the movable cam piston in the opposite direction of the engaging direction.

A clutch chamber 25b and an oil chamber 25c are partitioned inside the coupling case 25 by a partition wall 25a, as illustrated enlarged in FIG. 1. In addition, a passage opening 25e, which is openable and closable by an open/close valve 25d, is formed on the partition wall 25a, thereby enabling the circulation of the lubrication oil that is enclosed in the coupling case 25. In addition, the clutch chamber 25b and the oil chamber 25c are placed in communication with by an oil flow channel 25f.

The clutch chamber 25b is a region for housing the electronically controlled coupling 16 in the coupling case 25. The oil chamber 25c is a region in the coupling case 25 in which lubrication oil is stored, which is moved from the clutch chamber 25b via the oil flow channel 25f by centrifugal force that is generated by the rotation of the electronically controlled coupling 16.

The passage opening 25e is a through-hole that is formed on the partition wall 25a and places the clutch chamber 25b in communication with the oil chamber 25c. The open/close valve 25d opens and closes the passage opening 25e in conjunction with the disengagement and engagement operation of the electronically controlled coupling 16. That is, the open/close valve 25d can be linked with the movable cam piston and is driven in a direction to close the passage opening 25e, when the movable cam piston makes a stroke in the clutch releasing direction. In addition, the valve is driven in a direction to open the passage opening 25e when the movable cam piston is makes a stroke in the clutch engaging direction. Then, this open/close valve 25d closes the passage opening 25e when the electronically controlled coupling 16 is in a fully released state. In addition, when the movable cam piston is makes a stroke from a position that fully releases the electronically controlled coupling 16 in the clutch engaging direction, the passage opening 25e is gradually opened. Then, when the electronically controlled coupling 16 is in a released state immediately before engagement, the passage opening 25e is maximally opened, and when the electronically controlled coupling 16 is engaged, the maximum open state of the passage opening 25e is maintained.

The oil flow channel 25f is a communication passage that constantly places the clutch chamber 25b in constant communication with the oil chamber 25c while bypassing the partition wall 25a. Lubrication oil that has adhered to the inner surface of the clutch chamber 25b due to the centrifugal force accompanying the rotation of the electronically controlled coupling 16 flows into this oil flow channel 25f. This oil flow channel 25f is inclined toward the oil chamber 25c side so that the lubrication oil that has flowed in will flow into the oil chamber 25c.

The clutch input shaft 16b extends through the coupling case 25 and is inserted in the clutch chamber 25b. In addition, the clutch output shaft 16d extends through the coupling case 25 and the partition wall 25a, extends through the oil chamber 25c, and is inserted in the clutch chamber 25b. In FIG. 1, 25g is an oil seal and 25h is an axle bearing. The oil seal 25g prevents the lubrication oil from leaking from the coupling case 25 while rotatably supporting the clutch input shaft 16b and the clutch output shaft 16d. In addition, the axle bearing 25h allows circulation of the lubrication oil, and it is possible for the lubrication oil that is stored in the oil chamber 25c to constantly leak out to the clutch chamber 25b in small portions via the axle bearing 25h, even when the passage opening 25e is closed by the open/close valve 25d.

Control System Configuration of the Four-Wheel Drive Vehicle

Figure 2:
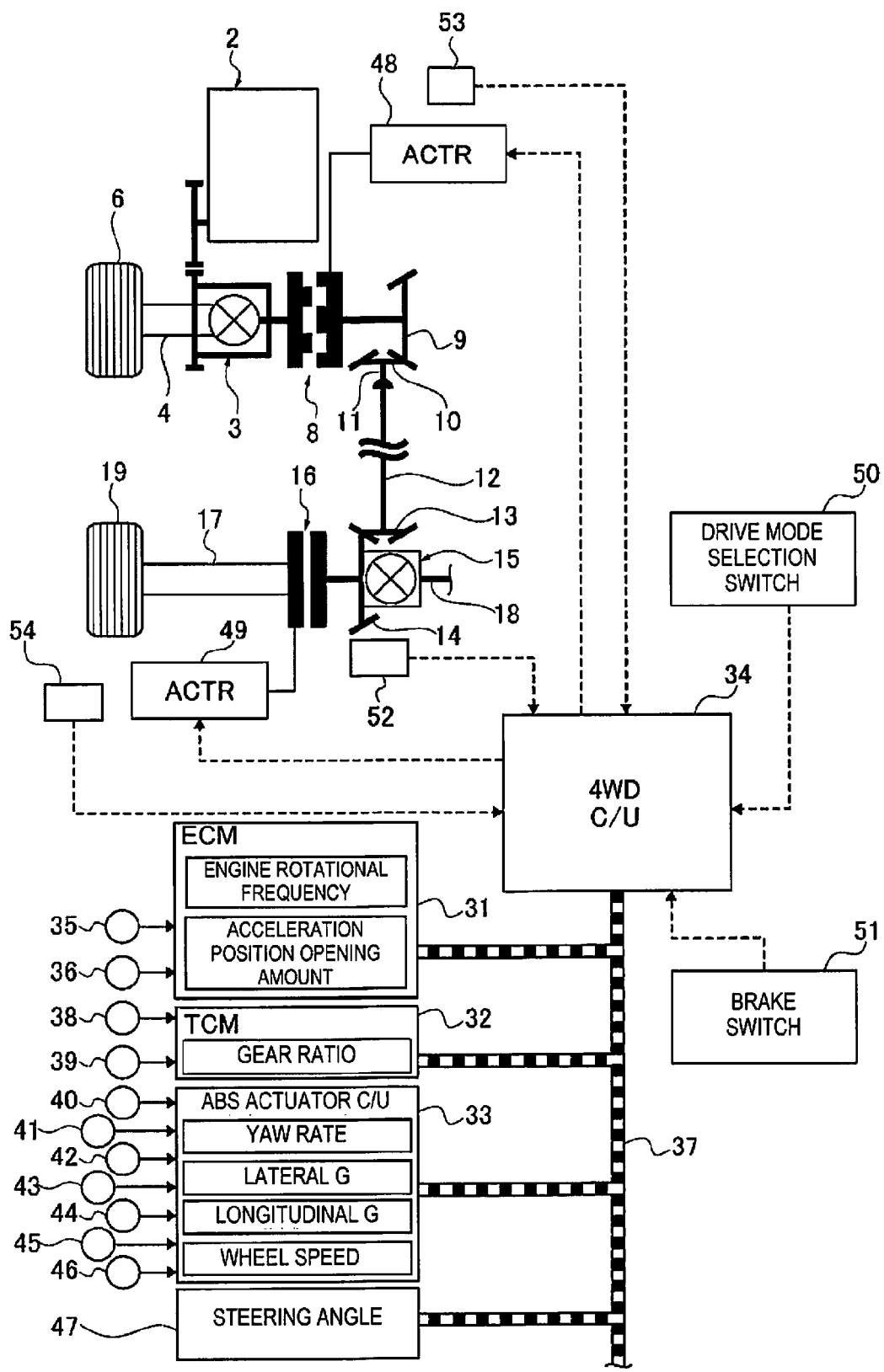
FIG. 2 is a block view of the control system illustrating the configuration of the control system of the front wheel drive based four-wheel drive vehicle to which is applied the clutch control device of the first embodiment.

FIG. 2 illustrates the configuration of the control system of the front wheel drive based four-wheel drive vehicle to which is applied the clutch control device. The control system configuration of the four-wheel drive vehicle will be described below based on FIG. 2.

The control system of the four-wheel drive vehicle is provided with an engine control module 31 (indicated "ECM" in FIG. 2), a transmission control module 32 (indicated "TCM" in FIG. 2), an ABS actuator control unit 33 (indicated "ABS actuator C/U" in FIG. 2), and a 4WD control unit 34 (indicated "4WCC/U" in FIG. 2), as illustrated in FIG. 2.

The engine control module 31 is a control device of the transverse engine 1, which inputs detection signals from an engine rotational frequency sensor 35, an accelerator position opening amount sensor 36, and the like. Engine rotational frequency information and accelerator position opening amount information (ACC information) are input from this engine control module 31 to the 4WD control unit 34 via a CAN communication line 37.

The transmission control module 32 is a control device of the transmission 2, which inputs detection signals from a transmission input rotational frequency sensor 38, the transmission output rotational frequency sensor 39, and the like. Gear ratio information (gear ratio information) is input from this transmission control module 32 to the 4WD control unit 34 via the CAN communication line 37.

The ABS actuator control unit 33 is a control device of an ABS actuator (not shown) which controls the brake fluid pressure of each wheel, which inputs detection signals from a yaw rate sensor 40, a lateral G sensor 41, a longitudinal G sensor 42, wheel speed sensors 43, 44, 45, 46, and the like. Wheel speed information of each wheel, such as yaw rate information, lateral G information, and longitudinal G information, are inputted from this ABS actuator control unit 33 to the 4WD control unit 34 via the CAN communication line 37. Besides the information described above, steering angle information from a steering angle sensor 47 is input to the 4WD control unit 34 via the CAN communication line 37.

The 4WD control unit 34 is a control device that controls the engagement and disengagement of the dog clutch 8 and the electronically controlled coupling 16, and carries out a calculation process based on various input information. That is, the 4WD control unit 34 corresponds to a clutch controller that carries out an engagement and disengagement control of the dog clutch 8 and an engagement and disengagement control of the electronically controlled coupling 16. Then, this 4WD control unit 34 outputs drive control commands to a dog clutch actuator 48 (solenoid pin) and an electronically controlled coupling actuator 49 (electric motor). Here, a drive mode selection switch 50, a brake switch 51 that detects the presence/absence of a braking operation, a ring gear rotational frequency sensor 52, a dog clutch stroke sensor 53, a motor rotation angle sensor 54, and the like are provided as input information sources from other than the CAN communication line 37.

The drive mode selection switch 50 is a switch with which a driver switches to select among a "2WD mode," a "lock mode," and an "auto mode." When the "2WD mode" is selected, a front wheel drive 2WD state (two-wheel drive travel) in which the dog clutch 8 and the electronically controlled coupling 16 are released is maintained. When the "lock mode" is selected, a full 4WD state (four-wheel drive travel) in which the dog clutch 8 and the electronically controlled coupling 16 are engaged is maintained. Furthermore, when the "auto mode" is selected, the engagement and disengagement of the dog clutch 8 and the electronically controlled coupling 16 is automatically controlled in accordance with the vehicle state (vehicle speed, accelerator position opening amount), and the drive mode is automatically switched.

Here, in "auto mode" there is a choice between an "eco-auto mode," which is selected when prioritizing improvement in fuel efficiency, and a "sports auto mode," which is selected when prioritizing the four-wheel drive performance, and the state of the electronically controlled coupling 16 in a standby two-wheel drive mode in which the dog clutch 8 is engaged and the electronically controlled coupling 16 is released differs depending on the selected mode. That is, when the "eco-auto mode" is selected, the electronically controlled coupling 16 is put into a fully released state and waits during the standby two-wheel drive mode. At this time, the passage opening 25*e* is closed by the open/close valve 25*d*, and the lubrication oil is stored in the oil chamber 25*c*. In contrast, when the "sports auto mode" is selected, the electronically controlled coupling 16 is put into a released state immediately before engagement and waits during the standby two-wheel drive mode. At this time, the passage opening 25*e* is opened by the open/close valve 25*d*, and the lubrication oil flows into the clutch chamber 25*b*. This "eco-auto mode" and the "sports auto mode" are freely selected by the driver.

The "fully released state" is a state in which the input-side clutch plate 16*a* and the output-side clutch plate 16*c* of the electronically controlled coupling 16 is separated, the two plates 16*a*, 16*c* do not come into contact immediately after the movable cam piston is moved to the clutch engaging side, and a clutch engagement capacity is not generated. In addition, the "released state immediately before engagement" is a state in which, while the clutch engagement capacity is zero, the input-side clutch plate 16*a* and the output-side clutch plate 16*c* are slightly in contact so that a clutch engagement capacity will be generated immediately if the movable cam piston is moved to the clutch engaging side even by a small amount.

The ring gear rotational frequency sensor 52 is a sensor for acquiring output rotational speed information of the dog clutch 8, and which calculates the output side rotational frequency of the dog clutch 8 by taking into consideration the rear side gear ratio and the front side gear ratio upon calculation with respect to the detected value of the ring gear rotational frequency. The input rotational speed information of the dog clutch 8 is obtained by calculation using the engine rotational frequency, the gear ratio, and the final gear ratio.

Drive Mode Switching Configuration

Figure 3:
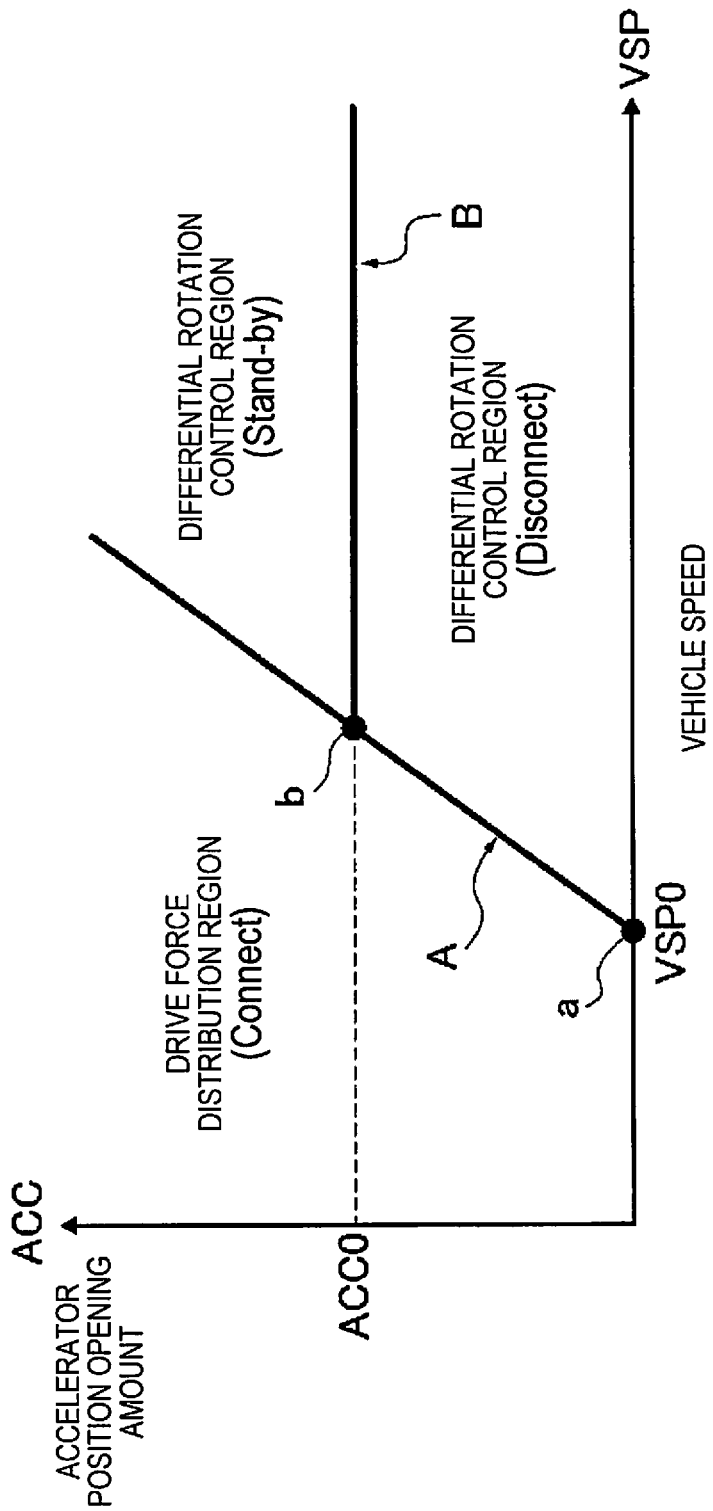
FIG. 3 is a basic map view illustrating a drive mode switching map corresponding to the vehicle speed and the accelerator position opening amount when the "auto mode" of the first embodiment is selected.
Figure 4:
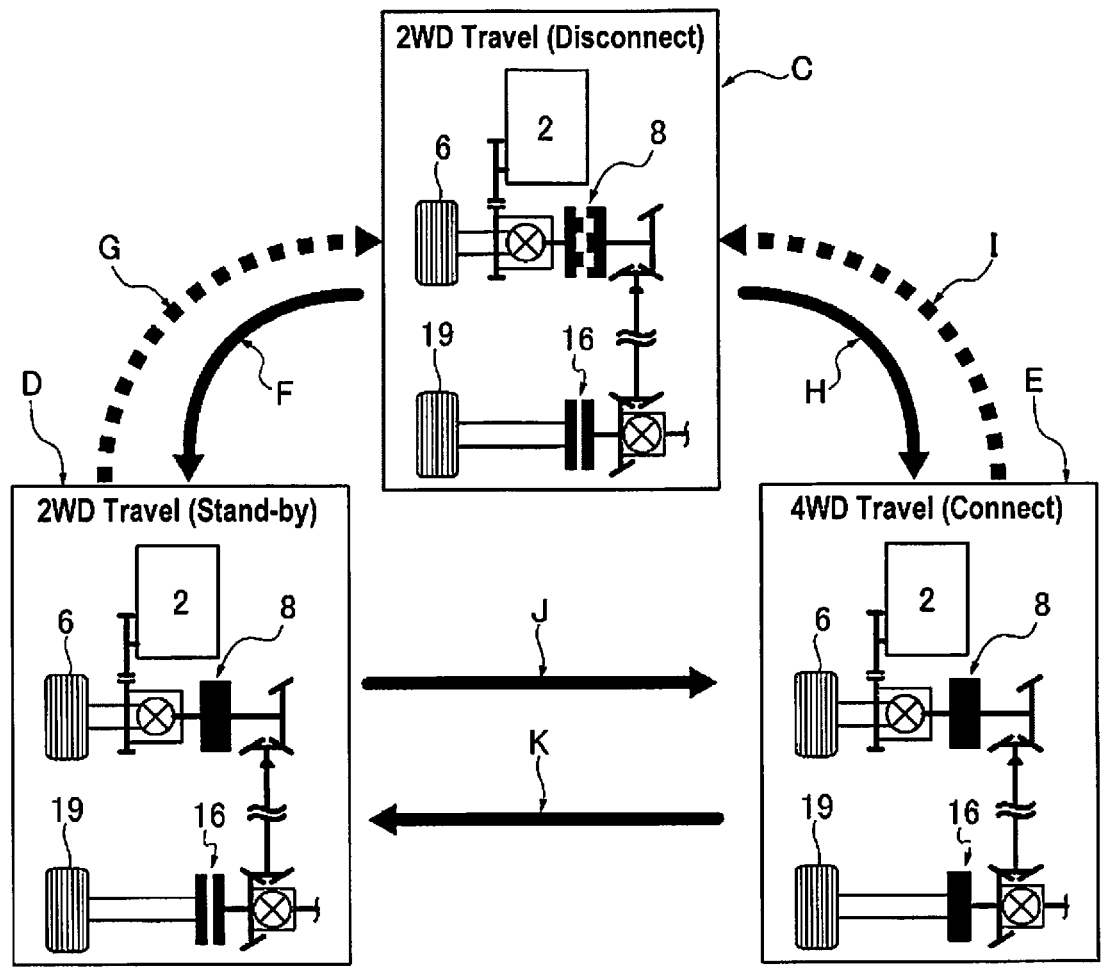
FIG. 4 is a drive mode transition view illustrating the switching transition of the drive mode (disconnected, two-wheel drive mode/standby two-wheel drive mode/connected, four-wheel drive mode) when the "auto mode" of the first embodiment is selected.

FIG. 3 illustrates a drive mode switching map corresponding to the vehicle speed and the accelerator position opening amount. FIG. 4 illustrates the switching transition of the drive mode (disconnected, two-wheel drive mode/standby two-wheel drive mode/connected, four-wheel drive mode), when the "auto mode" of the first embodiment is selected. The drive mode switching configuration will be described below, based on FIGS. 3 and 4.

In the first embodiment, the drive mode when the "auto mode" is selected comprises a disconnected, two-wheel drive mode (Disconnect), a standby two-wheel drive mode (Standby), and a connected, four-wheel drive mode (Connect). These three drive modes are switched among each other by the 4WD control unit 34 on the basis of the vehicle speed (VSP), the accelerator position opening amount (ACC) which represents the requested drive force of the driver, and the drive mode switching map illustrated in FIG. 3.

The drive mode switching map is set to be separated into the disconnected, two-wheel drive mode (referred to as "differential rotation control region (Disconnect)" in FIG. 3), the standby two-wheel drive mode (referred to as "differential rotation control region (Standby)" in FIG. 3), and connected, four-wheel drive mode (referred to as "drive force distribution region (Connect)" in FIG. 3), in accordance with the vehicle speed and the accelerator position opening amount, as illustrated in FIG. 3. These three drive modes are separated by a region dividing line A (threshold vehicle speed) in which the accelerator position opening amount is increased proportionally with the increase in the vehicle speed from a base point a of a set vehicle speed VSP0 at which the accelerator position opening amount is zero, and a region dividing line B (threshold requested drive force) of a constant accelerator position opening amount ACC0, which is drawn from an intersection b with the region dividing line A toward the high vehicle speed side.

The disconnected, two-wheel drive mode (differential rotation control region (Disconnect)) is set in the region in which the accelerator position opening amount is less than or equal to the set accelerator position opening amount ACC0, and which is surrounded by the vehicle speed axis line on which the accelerator position opening amount is zero, the region dividing line A, and the region dividing line B. That is, the mode is set in a region in which, since the accelerator position opening amount is less than or equal to the set accelerator position opening amount ACC0 (the requested drive force of the driver is low) even in a high vehicle speed region, the frequency of occurrence of differential rotation of the left and right front wheels 6 and 7 and the left and right rear wheels 19 and 20 due to driving slip is extremely small, and even if driving slip occurs, the required four-wheel drive performance is low so that the slip is increased slowly.

The standby two-wheel drive mode (differential rotation control region (Standby)) is set in the region in which the accelerator position opening amount exceeds the set accelerator position opening amount ACC0, and which is surrounded by the region dividing line A and the region dividing line B. That is, the mode is set in a region in which the accelerator position opening amount exceeds the set accelerator position opening amount ACC0 (the requested drive force of the driver is high) in a high vehicle speed region, while the required four-wheel drive performance is low, since if differential rotation of the left and right front wheels 6 and 7 and the left and right rear wheels 19 and 20 is generated due to driving slip, there is a high probability that the slip will increase rapidly.

The connected, four-wheel drive mode (drive force distribution region (Connect)) is set in the region surrounded by the accelerator position opening amount axis line on which the vehicle speed is zero, the vehicle speed axis line on which the accelerator position opening amount is zero, and the region dividing line A. That is, the mode is set in a region in which the required four-wheel drive performance is high, such as when starting or during high-load travel in which the vehicle speed is low (low vehicle speed region) but the accelerator position opening amount is high.

When the disconnected, two-wheel drive mode is selected, the travel mode becomes "2WD travel (Disconnect)" in which both the dog clutch 8 and the electronically controlled coupling 16 are released, as illustrated in frame C of FIG. 4. Basically, in this disconnected, two-wheel drive mode, a front wheel drive two-wheel drive travel (hereinafter referred to as "2WD travel") in which drive force is transmitted only to the left and right front wheels 6 and 7 is maintained. However, if driving slip occurs in the left and right front wheels 6 and 7 during a front wheel drive 2WD travel and the driving slip amount (or the driving slip rate) exceeds a threshold value, the electronically controlled coupling 16 is frictionally engaged. Then, when a rotation synchronization state is determined, the dog clutch 8 is engaged to put into four-wheel drive travel (hereinafter referred to as "4WD travel"). Drive force is thereby allocated to the left and right rear wheels 19 and 20 as well, and a differential rotation control to suppress driving slip is carried out.

When the standby two-wheel drive mode is selected, the travel mode becomes "2WD travel (Standby)" in which the dog clutch 8 is engaged and the electronically controlled coupling 16 is released, as illustrated in frame D of FIG. 4. In this standby two-wheel drive mode, although the dog clutch 8 is engaged, basically a front wheel drive 2WD travel in which drive force is transmitted only to the left and right front wheels 6 and 7 is maintained. However, if driving slip occurs in the left and right front wheels 6 and 7 during a front wheel drive 2WD travel and the driving slip amount (or the driving slip rate) exceeds a threshold value, only the electronically controlled coupling 16 is frictionally engaged, since the dog clutch 8 is engaged beforehand. Differential rotation control to suppress driving slip is carried out by allocating drive force to the left and right rear wheels 19 and 20 with good responsiveness, by this frictional engagement of the electronically controlled coupling 16.

When the connected, four-wheel drive mode is selected, the travel mode becomes "4WD travel (Connect)" in which both the dog clutch 8 and the electronically controlled coupling 16 are engaged, as illustrated in frame E of FIG. 4. Basically, in this connected, four-wheel drive mode, drive force distribution control is carried out, which achieves the optimum drive force distribution to the left and right front wheels 6 and 7 and to the left and right rear wheels 19 and 20 that is suited to the road conditions (for example, distribution control to the front and rear wheels at the time of start). However, if a turning state of the vehicle is determined during drive force distribution control from information from the steering angle sensor 47, the yaw rate sensor 40, the lateral G sensor 41, or the longitudinal G sensor 42, control is carried out in which the engagement capacity of the electronically controlled coupling 16 is decreased to reduce the possibility of a tight corner braking phenomenon.

The switching transition between the disconnected, two-wheel drive mode (2WD travel (Disconnect)), the standby two-wheel drive mode (2WD travel (Standby)), and the connected, four-wheel drive mode (4WD travel (Connect)) is carried out by a switching request that is output when an operating point, which is determined by the vehicle speed and the accelerator position opening amount, crosses the region dividing line A and the region dividing line B, illustrated in FIG. 3. The switching transition speed of each drive mode is determined so that the transition speed to a drive mode that meets a 4WD request is prioritized over the transition speed to the disconnected, two-wheel drive mode that meets a fuel efficiency request.

That is, the switching transition speed of 2WD travel (Standby)-2WD travel (Disconnect) (arrow G in FIG. 4) is configured to be slower than the switching transition speed of 2WD travel (Disconnect)-2WD travel (Standby) (arrow F in FIG. 4). Similarly, the switching transition speed of 4WD travel (Connect)-2WD travel (Disconnect) (arrow I in FIG. 4) is configured to be slower than the switching transition speed of 2WD travel (Disconnect)-4WD travel (Connect) (arrow H in FIG. 4). On the other hand, the switching transition speed of 4WD travel (Connect)-2WD travel (Standby) (arrow K in FIG. 4) is configured to be the same, relatively fast speed as the switching transition speed of 2WD travel (Standby)-4WD travel (Connect) (arrow J in FIG. 4). In addition, the "transition speed" is the time between an occurrence of a switching request and the completion of transition. Here, when this transition speed is slow (arrow G, arrow I), a mode transition control is started when a predetermined time has elapsed after a switching request is output. In addition, when the transition speed is fast (arrow F, arrow H, arrow J, arrow K), a mode transition control is started immediately after a switching request is output.

Furthermore, in this first embodiment, when selecting the disconnected, two-wheel drive mode, the passage opening 25e is closed by the open/close valve 25d provided to the coupling case 25, in conjunction with the disengagement control of the electronically controlled coupling 16. The lubrication oil that is moved from the clutch chamber 25b to the oil chamber 25c due to the centrifugal force generated by the rotation of the electronically controlled coupling 16 is stored in the oil chamber 25c. At this time, while the lubrication oil leaks from the oil chamber 25c to the clutch chamber 25b via the axle bearing 25h, the amount of lubrication oil that is supplied to the electronically controlled coupling 16 housed in the clutch chamber 25b is limited, and the amount of lubrication oil in the clutch chamber 25b is reduced.

Then, when oil stirring conditions described below are met when in the disconnected, two-wheel drive mode (2WD travel (Disconnect)), the electronically controlled coupling 16 is engaged, even in the disconnected, two-wheel drive mode (2WD travel (Disconnect)). Accordingly, the passage opening 25e is opened by the open/close valve 25d in conjunction with this engagement control of the electronically controlled coupling 16. Then, the lubrication oil that is stored in the oil chamber 25c is made to flow from the oil chamber 25c to the clutch chamber 25b.

Oil Temperature Control Configuration Process

Figure 5:
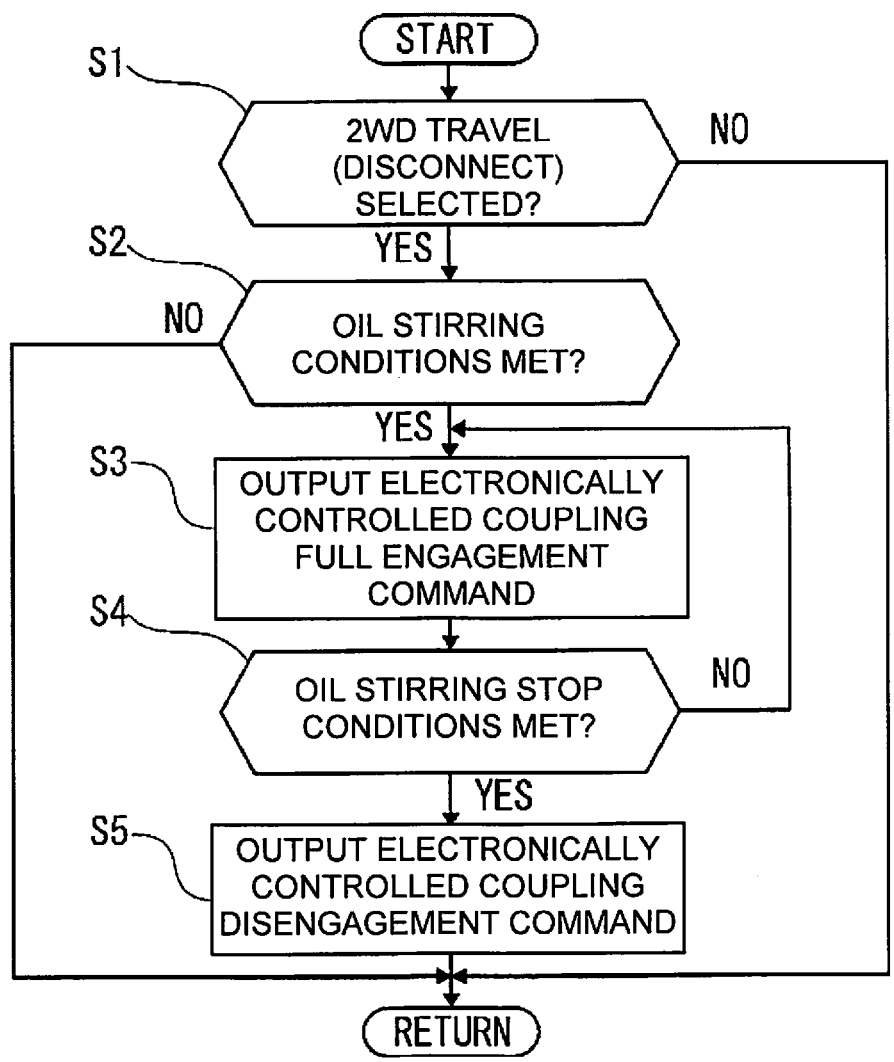
FIG. 5 is a flowchart illustrating the flow of the oil temperature control process that are executed in the 4WD control unit of the first embodiment.

FIG. 5 is a flowchart illustrating the flow of the oil temperature control process that is executed in the 4WD control unit of the first embodiment. Each of the process in FIG. 5, which represents the oil temperature control configuration process will be described below.

In Step S1, it is determined whether or not the disconnected, two-wheel drive mode (2WD travel (Disconnect)) is selected as the current drive mode. If YES (disconnected, two-wheel drive mode selected), the process proceeds to Step S2. If NO (other than disconnected, two-wheel drive mode selected), the process proceeds to RETURN. Here, the selected drive mode is determined based on the position of an operating point, which is determined by the vehicle speed and the accelerator position opening amount, on the drive mode switching map illustrated in FIG. 3. That is, if the operating point is in the disconnected, two-wheel drive mode region (region indicated by "differential rotation control region (Disconnect)" in FIG. 3) on the drive mode switching map, it is determined that the disconnected, two-wheel drive mode is selected. The vehicle speed (VSP) is calculated from the wheel speed of the left and right rear wheels 19 and 20, which are detected by the wheel speed sensors 45 and 46. In addition, the accelerator position opening amount (ACC) is detected by the accelerator position opening amount sensor 36. Additionally, when the disconnected, two-wheel drive mode is selected, both the dog clutch 8 and the electronically controlled coupling 16 are released. Furthermore, the passage opening 25e is closed by the open/close valve 25d that is provided to the coupling case 25, in conjunction with the disengagement control of the electronically controlled coupling 16. The lubrication oil is thereby stored in the oil chamber 25c, and the amount of lubrication oil that is supplied to the electronically controlled coupling 16 in the clutch chamber 25b is limited.

In Step S2, following the determination that the disconnected, two-wheel drive mode is selected in Step S1, it is determined whether or not the oil stirring conditions are met. If YES (oil stirring conditions are met), the process proceeds to Step S3. If NO (oil stirring conditions not met), the process proceeds to RETURN. Here, the "oil stirring conditions" are conditions in which the temperature of the lubrication oil supplied to the electronically controlled coupling 16 (lubrication oil in the clutch chamber 25b) is determined to have been elevated above a predetermined threshold temperature. Here, it is assumed that the disengagement time of the electronically controlled coupling 16 in the disconnected, two-wheel drive mode has reached a predetermined time.

In Step S3, following the determination that the oil stirring conditions are met in Step S2, an engagement command to fully engage the electronically controlled coupling 16 is output, and the process proceeds to Step S4. Here, with the output of an engagement command of the electronically controlled coupling 16, the movable cam piston is makes a stroke in the engagement direction by the electronically controlled coupling actuator 49, and the electronically controlled coupling 16 is placed in an engaged state. In addition, the passage opening 25e is opened by the open/close valve 25d in conjunction with the engagement control of the electronically controlled coupling 16. The lubrication oil in the oil chamber 25c thereby flows into the clutch chamber 25b via the passage opening 25e, and the amount of lubrication oil that is supplied to the electronically controlled coupling 16 in the clutch chamber 25b is increased. Furthermore, the lubrication oil that flows into the clutch chamber 25b is stirred by the rotation of the electronically controlled coupling 16, flows into the oil flow channel 25f due to the centrifugal force of this rotation, re-enters the oil chamber 25c, and circulates inside the coupling case 25.

In Step S4, following the output of the electronically controlled coupling engagement command in Step S3, it is determined whether or not oil stirring stop conditions are met. If YES (oil stirring stop conditions are met), the process proceeds to Step S5. If NO (oil stirring stop conditions are not met), the process return to Step S3. Here, the "oil stirring stop conditions" are conditions in which the temperature of the lubrication oil supplied to the electronically controlled coupling 16 (lubrication oil in the clutch chamber 25b) is determined to have decreased below a predetermined threshold temperature. Here, it is assumed that the engagement time of the electronically controlled coupling in the disconnected, two-wheel drive mode has reached a predetermined time.

In Step S5, following the determination that the oil stirring stop conditions are met in Step S4, a disengagement command to fully disengage the electronically controlled coupling 16 is output, and the process proceeds to RETURN. Here, with the output of the full disengagement command of the electronically controlled coupling 16, the movable cam piston makes a stroke in the disengaging direction by the electronically controlled coupling actuator 49, and the electronically controlled coupling 16 is placed in a fully disengaged state. In addition, the passage opening 25e is opened by the open/close valve 25d in conjunction with the disengagement control of the electronically controlled coupling 16. The lubrication oil is thereby stored in the oil chamber 25c, and the amount of lubrication oil that is supplied to the electronically controlled coupling 16 in the clutch chamber 25b is again limited.

Next, the "oil temperature control action" in the clutch control device for a four-wheel drive vehicle of the first embodiment will be described.

Oil Temperature Control Action

Figure 6:
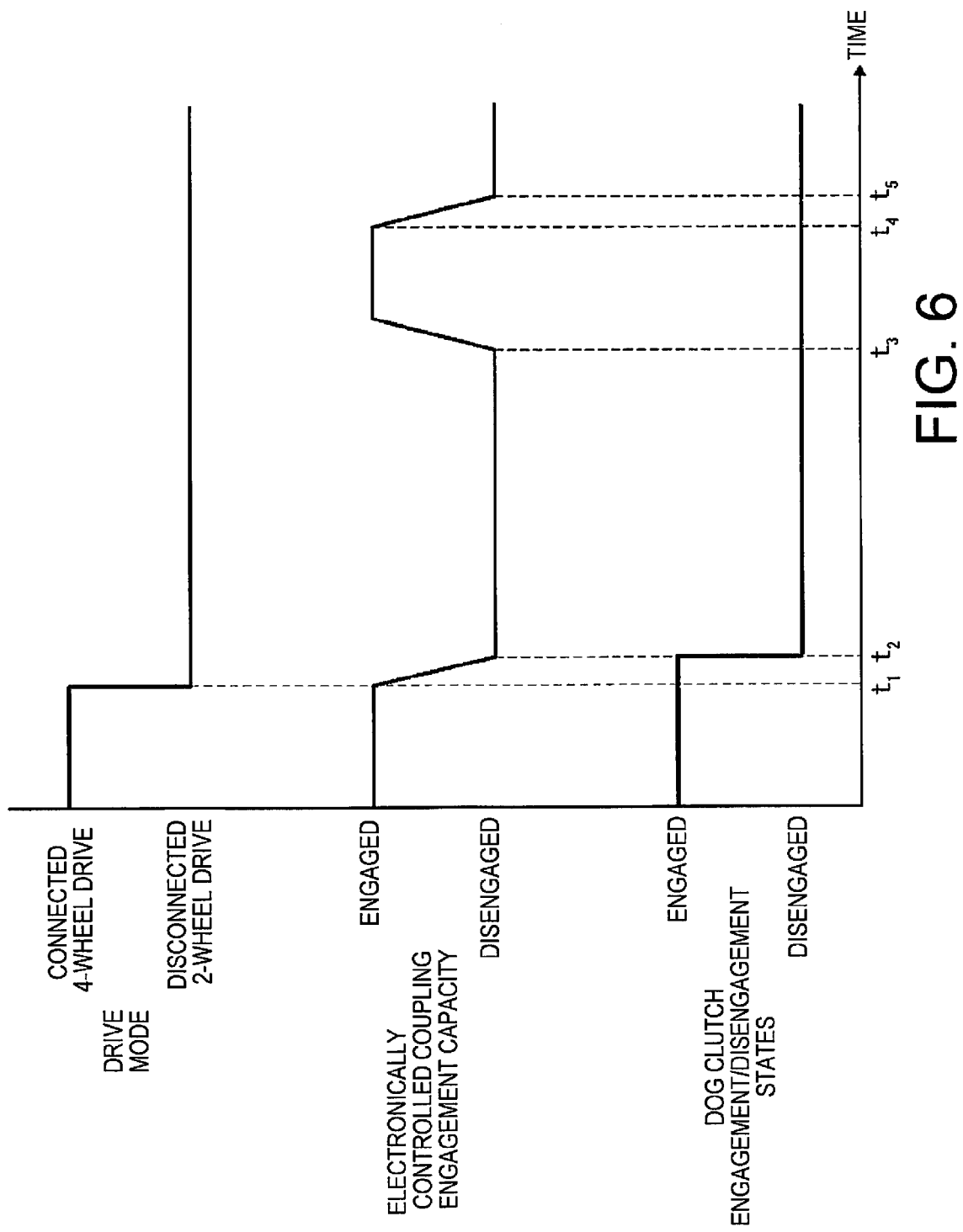
FIG. 6 is a time chart illustrating the features of the engagement capacity of the electronically controlled coupling and the engagement/disengagement states of the dog clutch, when switching from the connected, four-wheel drive mode to the disconnected, two-wheel drive mode in the first embodiment.
Figure 7:
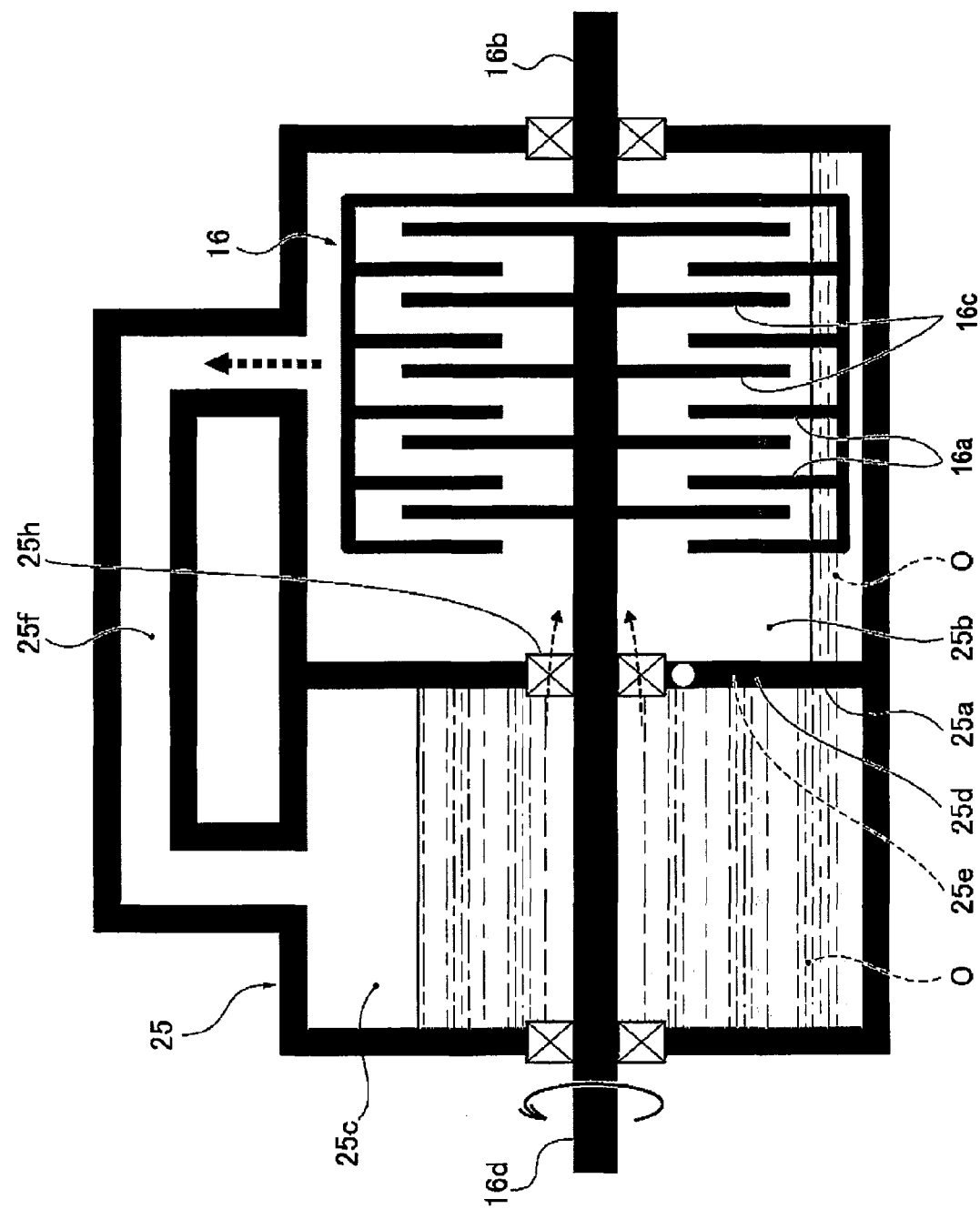
FIG. 7 is an explanatory view illustrating the flow of the lubrication oil when the oil stirring conditions are not met when in the disconnected, two-wheel drive mode of the first embodiment.
Figure 8:
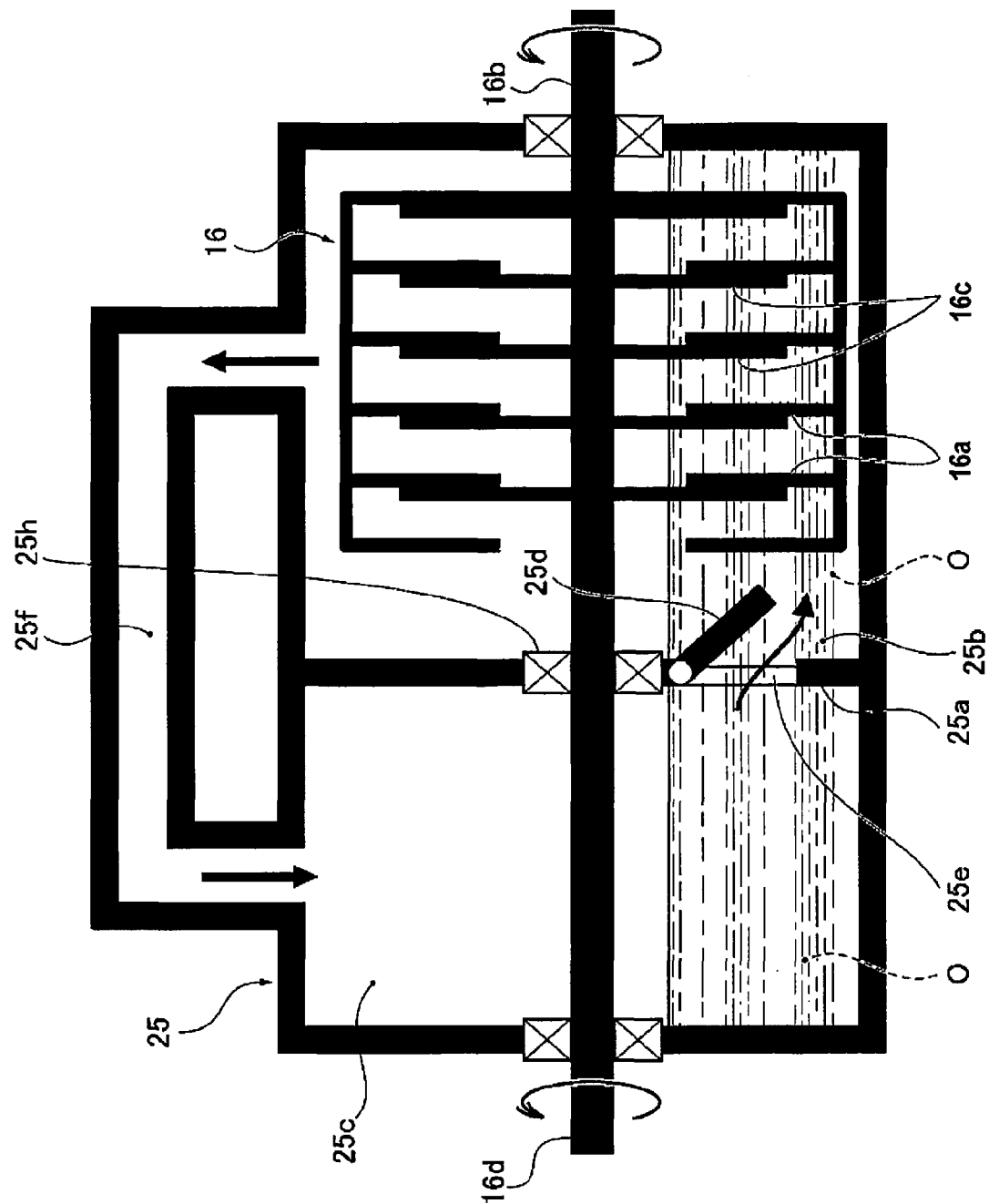
FIG. 8 is an explanatory view illustrating the flow of the lubrication oil when the oil stirring conditions are met when in the disconnected, two-wheel drive mode of the first embodiment.

FIG. 6 is a time chart illustrating the features of the engagement capacity of the electronically controlled coupling and the engagement/disengagement states of the dog clutch, when switching from the connected, four-wheel drive mode to the disconnected, two-wheel drive mode in the first embodiment. In addition, FIG. 7 is an explanatory view illustrating the flow of the lubrication oil when the oil stirring conditions are not met, and FIG. 8 is an explanatory view illustrating the flow of the lubrication oil when the oil stirring conditions are met, when in the disconnected, two-wheel drive mode of the first embodiment. The oil temperature control action of the first embodiment will be described below with reference to FIG. 6-FIG. 8.

If a mode switch request is output at time $t_1$, as shown in FIG. 6, to switch the drive mode from the connected, four-wheel drive mode to the disconnected, two-wheel drive mode, a YES response is issued in Step S1 in the flowchart of FIG. 5, and, first, a disengagement command for fully releasing the electronically controlled coupling 16 is output. The clutch engagement capacity in the electronically controlled coupling 16 thereby starts to decrease.

When the clutch engagement capacity in the electronically controlled coupling 16 becomes zero and the electronically controlled coupling 16 if fully disengaged at time $t_2$, the dog clutch 8 is subsequently disengaged. Both the dog clutch 8 and the electronically controlled coupling 16 are thereby placed in a disengaged state.

In addition, at this time, the clutch output shaft 16d of the electronically controlled coupling 16 is rotated together with the rotation of the left rear wheel 19. Accordingly, the lubrication oil O in the clutch chamber 25b is moved to the oil chamber 25c via the oil flow channel 25f by the centrifugal force generated by the rotation of the output side clutch plate 16c. On the other hand, the passage opening 25e of the coupling case 25 is closed by the open/close valve 25d, in conjunction with the disengagement control of the electronically controlled coupling 16, as illustrated in FIG. 7. The lubrication oil is thereby stored in the oil chamber 25c, and the amount of lubrication oil in the clutch chamber 25b that is supplied to the electronically controlled coupling 16 is limited. The lubrication oil in the oil chamber 25c leaks into the clutch chamber 25b via the axle bearing 25h that supports the clutch output shaft 16d, and the inflow amount at this time is less than the amount of lubrication oil that is moved from the clutch chamber 25b to the oil chamber 25c by centrifugal force. Accordingly, the amount of lubrication oil in the clutch chamber 25b will not increase. Then, if the amount of lubrication oil in the clutch chamber 25b falls below a predetermined amount, there will be no significant movement of lubrication oil into the oil chamber 25c. In other words, if the amount of lubrication oil that leaks into the clutch chamber 25b via the axle bearing 25h and the amount of lubrication oil that moves into the oil chamber 25c due to the centrifugal force reach equilibrium, the amount of lubrication oil in the clutch chamber 25b is stabilized at a small amount.

In addition, by regulating the amount of lubrication oil in the clutch chamber 25b when in the disconnected, two-wheel drive mode in this manner, even if the clutch output shaft 16d and the output side clutch plate 16c are rotated together with the left rear wheel 19, the drag torque caused by the lubrication oil in the electronically controlled coupling 16 can be suppressed. Accordingly, it is possible to achieve an improvement in fuel efficiency. However, since the amount of lubrication oil that remains in the clutch chamber 25b and supplied to the electronically controlled coupling 16 is small, the oil heating capacity in the clutch chamber 25b is also small. Consequently, since there is no contact between the input-side clutch plate 16a and the output-side clutch plate 16c of the electronically controlled coupling 16, the lubrication oil temperature between the two plates 16a, 16c cannot be easily reduced.

Thus, when the oil stirring conditions are met at time $t_3$, due to a predetermined time having elapsed from time $t_2$, at which point the temperature of the lubrication oil in the clutch chamber 25b can be determined to have been elevated, the process proceeds to Step S1-Step S2-Step S3 in the flowchart illustrated in FIG. 5, and an engagement command to fully engage the electronically controlled coupling 16 is output. The movable cam piston thereby makes a stroke in the engaging direction by the electronically controlled coupling actuator 49, and the electronically controlled coupling 16 is placed in an engaged state, as illustrated in FIG. 8. Furthermore, at this time, the passage opening 25e of the coupling case 25 is opened by the open/close valve 25d, in conjunction with the engagement control of the electronically controlled coupling 16.

The lubrication oil O that is stored in the oil chamber 25c thereby flows into the clutch chamber 25b via the passage opening 25e. Here, the lubrication oil O that is stored in the oil chamber 25c is stored without being stirred. Additionally, since there is a large amount of lubrication oil, the oil heating capacity is high. That is, the temperature of the lubrication oil O in the oil chamber 25c is relatively low compared to the lubrication oil O in the clutch chamber 25b. Then, as a result of the lubrication oil O in the oil chamber 25c with a relatively low temperature flowing into the clutch chamber 25b, low temperature lubrication oil O is added to high temperature lubrication oil O, and it becomes possible to reduce the temperature of the lubrication oil O in the clutch chamber 25b. In addition, since the amount of lubrication oil in the clutch chamber 25b increases, the oil heating capacity in the clutch chamber 25b can be increased, and it becomes possible to suppress an elevation in the temperature of the lubrication oil O that is supplied to the electronically controlled coupling 16. As a result, it becomes possible to suppress an elevation in the temperature of the lubrication oil O that is supplied to the electronically controlled coupling 16 (lubrication oil O in the clutch chamber 25b), and to control the oil temperature to an appropriate temperature.

Additionally, with the engagement of the electronically controlled coupling 16, the input side clutch plate 16a and the output side clutch plate 16c will rotate integrally. Then, the lubrication oil O in the clutch chamber 25b is stirred by this rotation and flows into the oil flow channel 25f due to the centrifugal force generated by the rotation and re-enters the oil chamber 25c to circulate inside the coupling case 25. As a result of the lubrication oil O being stirred in the clutch chamber 25b in this manner, the lubrication oil O can circulate inside the coupling case 25, and it is possible to quickly reduce the lubrication oil temperature.

Furthermore, in this first embodiment, when the oil stirring conditions are met, the electronically controlled coupling 16 is fully engaged. Accordingly, it is possible to integrally rotate the input-side clutch plate 16a and the output-side clutch plate 16c in the electronically controlled coupling 16. It is thereby possible to maximize the oil stirring performance in the clutch chamber 25b, and to reduce the lubrication oil temperature more quickly. Moreover, here, when the electronically controlled coupling 16 is fully engaged, the open/close valve 25d maintains the passage opening 25e in the maximally open state. Accordingly, it is possible to maximize the amount of lubrication oil that flows from the oil chamber 25c into the clutch chamber 25b, and to reduce the lubrication oil temperature in the clutch chamber 25b as quickly as possible.

Additionally, since the open/close valve 25d opens and closes the passage opening 25e in conjunction with the engagement and disengagement control of the electronically controlled coupling 16, it is possible to open and close the passage opening 25e with the open/close valve 25d, which does not require individual actuators or the like, and to control the lubrication oil temperature with a simple configuration.

Then, when the oil stirring stop conditions are met at time $t_4$, due to a predetermined time having elapsed from time $t_3$, at which point the temperature of the lubrication oil in the clutch chamber 25b can be determined to have decreased, the process proceed to Step S4-Step S5 in the flowchart illustrated in FIG. 5, and a disengagement command to fully disengage the electronically controlled coupling 16 is output. The movable cam piston thereby makes a stroke in the disengaging direction by the electronically controlled coupling actuator 49, and the electronically controlled coupling 16 is placed in a disengaged state, as illustrated in FIG. 7. Furthermore, at this time, the passage opening 25e of the coupling case 25 is closed by the open/close valve 25d, in conjunction with the disengagement control of the electronically controlled coupling 16.

Accordingly, the lubrication oil O is again stored in the oil chamber 25c, and the lubrication oil amount in the clutch chamber 25b is regulated. Then, it is possible again to suppress the drag torque caused by the lubrication oil in the electronically controlled coupling 16, and to achieve an improvement in fuel efficiency.

When the oil stirring conditions are met again after time $t_5$ when the electronically controlled coupling 16 is fully disengaged, the electronically controlled coupling 16 is re-engaged, and the lubrication oil O is circulated from the oil chamber 25c to the clutch chamber 25b to reduce the oil temperature in the clutch chamber 25b by stirring the lubrication oil O. In addition, when the oil stirring stop conditions are met, the electronically controlled coupling 16 is disengaged and the lubrication oil O is stored in the oil chamber 25c to achieve an improvement in fuel efficiency. In this manner, it is possible to carry out an oil temperature control to prevent the lubrication oil O that remains in the clutch chamber 25b and supplied to the electronically controlled coupling 16 from reaching a high temperature while the disconnected, two-wheel drive mode continues to be selected, by repeating engagement and disengagement of the electronically controlled coupling 16.

Figure 9:
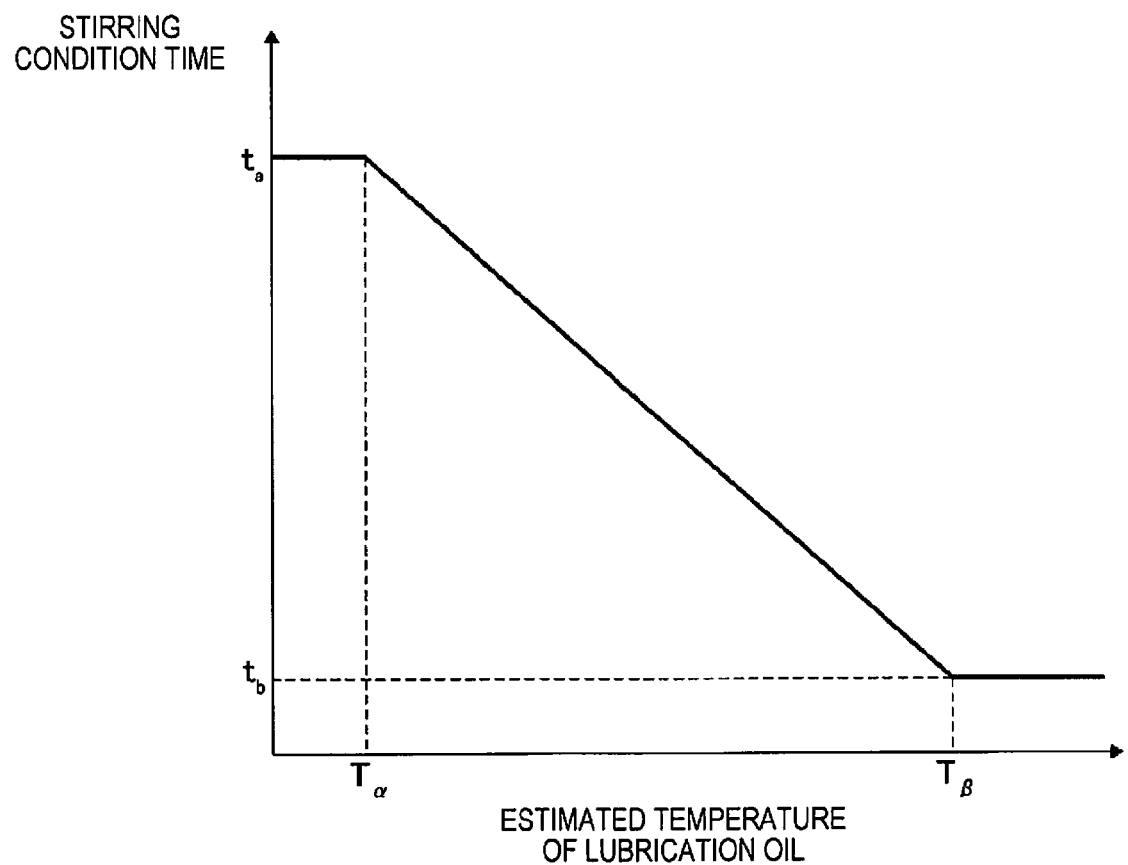
FIG. 9 is one example of a map illustrating the relationship between the stirring condition time and the estimated temperature of the lubrication oil in the first embodiment.

The establishment of the oil stirring conditions, which determine that the lubrication oil temperature in the clutch chamber 25b has been elevated, is set based on the "disengagement time of the electronically controlled coupling 16 when in the disconnected, two-wheel drive mode (hereinafter referred to as "stirring condition time"), and this stirring condition time is set in accordance with the estimated temperature of the lubrication oil in the clutch chamber 25b, as illustrated in FIG. 9. That is, the stirring condition time is set to extend with the decline in the estimated temperature of the lubrication oil and the less the lubrication oil temperature becomes elevated. Here, when the estimated temperature of the lubrication oil is less than or equal to a lower limit temperature Tα, the stirring condition temperature is set to a maximum time ta. In addition, when the estimated temperature of the lubrication oil is greater than or equal to an upper limit temperature Tβ, the stirring condition time will be set to a minimum time tb.

In addition, the estimated temperature of the lubrication oil in the clutch chamber 25b is estimated on the basis of the vehicle speed, the travel distance, the clutch engagement capacity in the electronically controlled coupling 16, the differential rotation, and the like. Furthermore, the temperature may be directly detected by a temperature sensor provided to the coupling case 25.

Next, the effects are described. The effects listed below can be obtained with the clutch control device for a four-wheel drive vehicle according to the first embodiment.

(1) A clutch control device for a four-wheel drive vehicle mounted in a four-wheel drive vehicle, in which, of the left and right front wheels 6 and 7 and the left and right rear wheels 19 and 20, one pair is set as the main drive wheels, which are connected to a drive source (transverse engine 1), and the other is set as the auxiliary drive wheels, which are connected to the drive source (transverse engine 1) via a clutch, and which comprises a dog clutch (dog clutch 8) provided at a drive branch position from the main drive wheels (left and right front wheels 6 and 7) to the auxiliary drive wheels (left and right rear wheels 19 and 20), and separates a system for transmitting drive force (rear wheel drive system) to the auxiliary drive wheels (left and right rear wheels 19 and 20) from a system for transmitting drive force (front wheel drive system) to the main drive wheels (left and right front wheels 6 and 7) by releasing the clutch, a friction clutch (electronically controlled coupling 16) provided in a downstream position of the dog clutch (dog clutch 8) which allocates a portion of the drive force from the drive source (transverse engine 1) to the auxiliary drive wheels (left and right rear wheels 19 and 20) in accordance with the clutch engagement capacity, and which is housed in a clutch case (coupling case 25), and a clutch controller (4WD control unit 34) that carries out an engagement and disengagement control of the dog clutch (dog clutch 8) and an engagement and disengagement control of the friction clutch (electronically controlled coupling 16), wherein the clutch case (coupling case 25) comprises a clutch chamber 25b that houses the friction clutch (electronically controlled coupling 16), an oil chamber 25c that is partitioned from the clutch chamber 25b by a partition wall 25a, an oil flow channel 25f that places the clutch chamber 25b in communication with the oil chamber 25c and flows lubrication oil O from the clutch chamber 25b to the oil chamber 25c due to the centrifugal force that is generated by a rotation of the friction clutch (electronically controlled coupling 16), and a passage opening 25e provided in the partition wall 25a that can be opened and closed, and wherein when a disconnected, two-wheel drive mode which releases the dog clutch (dog clutch 8) and the friction clutch (electronically controlled coupling 16) is selected, the clutch controller (4WD control unit 34) closes the passage opening 25e and stores the lubrication oil O in the oil chamber 25c, and after the disconnected, two-wheel drive mode is selected, when oil stirring conditions, in which the temperature of the lubrication oil in the clutch chamber 25b is elevated, are met, the clutch controller opens the passage opening 25e and causes the lubrication oil O to flow from the oil chamber 25c to the clutch chamber 25b. It is thereby possible to suppress an elevation of the temperature of the lubrication oil supplied to the friction clutch (electronically controlled coupling 16) during two-wheel drive travel with the friction clutch (electronically controlled coupling 16) released.

(2) The clutch controller (4WD control unit 34) is configured to engage the friction clutch (electronically controlled coupling 16) when the oil stirring conditions are met. Accordingly, in addition to the effect of (1) above, it is possible to stir the lubrication oil O in the clutch chamber 25b and circulate the lubrication oil O inside the coupling case 25, to quickly reduce the lubrication oil temperature.

(3) The clutch controller (4WD control unit 34) is configured to put the friction clutch (electronically controlled coupling 16) in a fully engaged state, when the oil stirring conditions are met. Accordingly, in addition to the effect of (2) above, it is possible to maximize the oil stirring performance in the clutch chamber 25b, and to reduce the lubrication oil temperature more quickly.

(4) An open/close valve 25d that opens and closes the passage opening 25e is provided in the partition wall 25a, and the open/close valve 25d drives the passage opening 25e in a closing direction in conjunction with a stroke of the friction clutch (electronically controlled coupling 16) in the disengagement direction, and drives the passage opening 25e in an opening direction in conjunction with a stroke of the friction clutch (electronically controlled coupling 16) in the engagement direction. Accordingly, in addition to the effects of (2) and (3) above, it is possible to open and close the passage opening 25e with the open/close valve 25d, which does not require individual actuators or the like, and to control the lubrication oil temperature with a simple configuration.

(5) The clutch controller (4WD control unit 34) is configured to close the passage opening 25e and store the lubrication oil O in the oil chamber 25c, when oil stirring stop conditions are met, in which the lubrication oil temperature in the clutch chamber 25b has decreased, after the establishment of the oil stirring conditions. Accordingly, in addition to any one of the effects of (1) to (4) above, after the establishment of the oil stirring stop conditions, the lubrication oil O is stored in the oil chamber 25c again, and the amount of lubrication oil in the clutch 25b is regulated. Therefore, it is possible to suppress the drag torque by the lubrication oil and to achieve an improvement in fuel efficiency.

The clutch control device for a four-wheel drive vehicle of the present invention was described above based on the first embodiment, but specific configurations thereof are not limited to the first embodiment, and various modifications and additions to the design can be made without departing from the protective scope of the invention according to each claim.

In the first embodiment, an example was shown in which the dog clutch 8 is disposed in an upstream position (position between the transverse engine 1 and the bevel gear 9) of the bevel gear 9 provided at a drive branch position to the left and right rear wheels 19 and 20, which are the auxiliary drive wheels, and in which the electronically controlled coupling 16 is disposed in a position of the left rear wheel drive shaft 17 from the bevel gear 9 to the left and right rear wheels 19 and 20 via the propeller shaft 12 and the rear differential 15; however, the invention is not limited thereto. For example, the dog clutch 8 may be disposed between the bevel gear 9 and the propeller shaft 12. In addition, the electronically controlled coupling 16 may be disposed in the position of the right rear wheel drive shaft 18, or disposed between the propeller shaft 12 and the rear differential 15.

Furthermore, the dog clutch 8 may be configured form a dog clutch in which engagement and disengagement is carried out by a shift fork that is driven by hydraulic pressure. Additionally, the electronically controlled coupling 16 may be configured from a hydraulic friction clutch that engages/disengages a multi-plate clutch by hydraulic pressure.

In the first embodiment, an example was shown in which the clutch control device for a four-wheel drive vehicle of the present invention is applied to a front wheel drive based four-wheel drive vehicle. However, the control device of the present invention may be applied to a rear wheel drive based four-wheel drive vehicle. Additionally, the control device may be applied to a hybrid vehicle comprising an engine and a motor as drive sources, or to an electric vehicle comprising only a motor.

The invention claimed is:

1. A clutch control device for a four-wheel drive vehicle having a pair of main drive wheels and a pair of auxiliary drive wheels, which are selectively connected to the drive source, the clutch control device comprising:
    a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch;
    a friction clutch comprising an input-side member that is connected to the dog clutch and an output-side member that is connected to the auxiliary drive wheels, the friction clutch being configured to allocate a portion of the drive force from the drive source to the auxiliary drive wheels in accordance with a clutch engagement capacity of the friction clutch, and the friction clutch being housed in a clutch case; and
    a clutch controller operatively coupled to the dog clutch and the friction clutch to selectively carry out an engagement and disengagement control of the dog clutch and an engagement and disengagement control of the friction clutch,
    the clutch case comprising a clutch chamber that houses the friction clutch, an oil chamber that is partitioned from the clutch chamber by a partition wall, an oil flow channel that fluidly communicates the clutch chamber with the oil chamber and conveys lubrication oil from the clutch chamber to the oil chamber by a centrifugal force that is generated by a rotation of at least the output-side member of the friction clutch, and a passage opening provided in the partition wall that can be opened and closed, and
    the clutch controller being programmed to close the passage opening and store the lubrication oil in the oil chamber, while a two-wheel drive mode is selected, in which the dog clutch and the friction clutch are released;
    the clutch controller being further programmed to open the passage opening to fluidly connect the oil chamber to the clutch chamber while in the two-wheel drive mode and an oil stirring condition is met in which a temperature of the lubrication oil in the clutch chamber is elevated above a predetermined threshold temperature.

2. The clutch control device as recited in claim 1, wherein the clutch controller is further programmed to engage the friction clutch when the oil stirring condition is met.

3. The clutch control device as recited in claim 2, wherein the clutch controller is further programmed to put the friction clutch into a fully engaged state when the oil stirring condition is met.

4. The clutch control device according to claim 3, wherein the partition wall includes an open/close valve that opens and closes the passage opening, and
    the open/close valve closes the passage opening in a closing direction in conjunction with a stroke of the friction clutch in a disengaging direction, and opens the passage opening in an opening direction in conjunction with a stroke of the friction clutch in an engaging direction.

5. The clutch control device according to claim 4, wherein the clutch controller further programmed to close the passage opening and store the lubrication oil in the oil chamber when the lubrication oil temperature in the clutch chamber has decreased, after establishment of the oil stirring condition.

6. The clutch control device according to claim 3, wherein the clutch controller further programmed to close the passage opening and store the lubrication oil in the oil chamber when the lubrication oil temperature in the clutch chamber has decreased, after establishment of the oil stirring condition.

7. The clutch control device as recited in claim 2, wherein the partition wall includes an open/close valve that opens and closes the passage opening, and
    the open/close valve closes the passage opening in a closing direction in conjunction with a stroke of the friction clutch in a disengaging direction, and opens the passage opening in an opening direction in conjunction with a stroke of the friction clutch in an engaging direction.

8. The clutch control device according to claim 7, wherein the clutch controller further programmed to close the passage opening and store the lubrication oil in the oil chamber when the lubrication oil temperature in the clutch chamber has decreased, after establishment of the oil stirring condition.

9. The clutch control device according to claim 2, wherein the clutch controller further programmed to close the passage opening and store the lubrication oil in the oil chamber when the lubrication oil temperature in the clutch chamber has decreased, after establishment of the oil stirring condition.

10. The clutch control device as recited in claim 1, wherein
the clutch controller further programmed to close the passage opening and store the lubrication oil in the oil chamber when the lubrication oil temperature in the clutch chamber has decreased, after establishment of the oil stirring condition.

* * * * *